United States Patent Office 3,542,776
Patented Nov. 24, 1970

---

3,542,776
MORPHOLINOISONICOTINAMIDES
William Dvonch, Radnor, and Harvey E. Alburn, West Chester, Pa., assignors to American Home Products Corporation, New York, N.Y., a corporation of Delaware
No Drawing. Continuation-in-part of application Ser. No. 589,820, Oct. 27, 1966, which is a continuation-in-part of application Ser. No. 392,920, Aug. 28, 1964. This application Oct. 25, 1967, Ser. No. 677,859
Int. Cl. C07d 87/24
U.S. Cl. 260—247.2
6 Claims

ABSTRACT OF THE DISCLOSURE

This invention relates to new isonicotinic acid hydrazides and more particularly to isonicotinic acid hydrazide derivatives of periodate oxidized pyrimidine and 6-amino-purine ribosides. The compounds are useful for blocking the auto-immune processes in warm-blooded animals.

---

This application is a continuation-in-part of U.S. Ser. No. 589,820, filed Oct. 27, 1966, and now abandoned which is in turn a continuation-in-part of U.S. Ser. No. 392,920, filed on Aug. 28, 1964 and now abandoned.

The immune response, production of antibodies, is the means by which immunity to infectious disease is generated, and is an expression of an animal body's biochemical integrity. Malfunctions of the nautral defense mechanism are known collectively as immunopathies. Immunopathies are characterized by an altered response to external foreign substances such as the manifestation of atopy or an allergy. Immunopathies also include auto-immune phenomena. The animal body is normally tolerant to its own tissues and does not treat them as foreign substances. A breakdown of the tolerance to an animal body's own tissues is the basis of auto-immune diseases.

In addition to the immunopathies, normal functioning of the immune response can be disadvantageous in other ways, for example, by causing rejection of transplanted tissues or organs. Suppression of the immune response can be of major therapeutic importance in particular instances.

Suppression of the immune response was initially observed after X-ray and cortisone treatment, and is also achieved by treatment with chemical compounds of three major classifications: alkylating agents (nitrogen mustards), purine antimetabolites (6-mercaptopurine) and the folic acid antagonists (methotrexate). Remarkable success in the treatment of auto-immune diseases, and prolongation of homografts with the foregoing anti-auto-immune compounds has stimualted research into this area of increasing interest and practical importance. The treatment of auto-immune diseases and prolonging homograft survival by selectively suppressing the immune response of an adult animal to a specific foreign substance is of major importance.

Unfortunately, the group of compounds known to have a desirable anti-immune activity have undesirable side effects. The alkylating agents are known to be carcinogenic and mutagenic, while the purine analogues are potentially so. The toxicity of the folic acid antagonists and corticosteroids is well known.

It has now been discovered that the members of a class of new compounds are effective as anti-auto-immune agents. Thus, the invention, in its broadest concept, resides in the method of blocking an auto-immune process in warm-blooded animals, such as standard experimental animals, by administering to the animals, a therapeutically active amount of a compound selected from the group having the following formula:

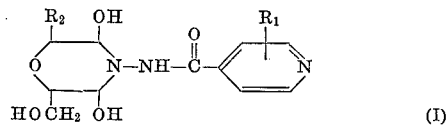

(I)

wherein $R_1$ is selected from the group consisting of hydrogen and methyl, and $R_2$ is selected from the group consisting of

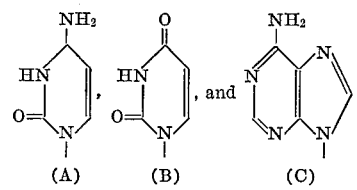

(A) (B) (C)

The new compounds of the present invention may be prepared by the treatment of periodate oxidized pyrimidines and 6-amino purine ribosides with isonicotinic acid hydrazides according to the following reaction sequence:

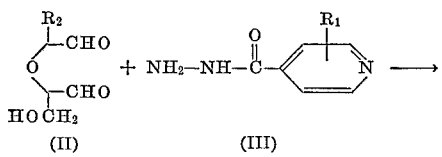

(II) (III)

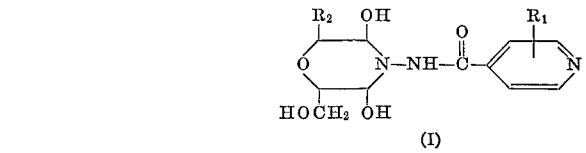

(I)

wherein $R_1$ and $R_2$ are defined as above. In carrying out the reaction, the appropriate periodate oxidation product (II) in an inert solvent such as water, dioxane, dimethylformamide, or the like, is treated with an equimolar amount of isonicotinic acid hydrazide (III) or an alkyl derivative thereof. The reaction mixture is allowed to stand for a period of from about one to ten hours, after which time crystals begin to form. The crystalline product (I) is then filtered off, washed and dried in a conventional manner. The product may be recrystallized if desired.

To prepare the periodate oxidation product used in the process of the present invention two to six moles of periodic acid in an aqueous solution are added to one mole of an appropriate pyrimidine or 6-amino purine riboside. The reaction is then conducted at a temperature of from about 5 to 35° C., in the absence of light, for a period of about ten minutes to fifty hours. The oxidation reaction normally proceeds smoothly. To separate and purify the desired product, the solution remaining after the oxidation step, is passed over a Dowex-1-acetate column and the column washed with water. The iodate-periodate-frese solution and the wash are then freeze-dried to afford the oxidation product in substantially quantitative yields.

The isonicotinic acid hydrazide used may be prepared according to the method described in U.S. Pat. 2,830,994, issued Apr. 15, 1958.

It is known that agents which are effective in auto-immune diseases are active also in preventing both the clinical and histopathologic changes which occur in experimental allergic encephalomyelitis (EAE). Such agents include the compounds thioguanine, Imuran, 6-mercaptopurine, cyclophosphamide, methotrexate and cortisone. Thus, the disease EAE may serve as a test standard, for some demyelinating diseases, more notably multiple sclerosis, and for auto-immune processes in general. (cf. N. W. Brandriss, J. W. Smith, R. N. Friedman, "Suppression of Allergic Encephalomyelitis by Antimetabolites; Ann. N.Y. Acad. Sci., 122:356, 1965.)

EAE is characterized by a delayed cellular hypersensitivity which is tissue specific and results in clinical paralysis of the animal. Histopathological lesions of the spinal cord and brain caused by the disease resemble those in human demyelinating disease, and it is thus classified as an experimental auto-allergic or auto-immune disease. (cf. B. H. Waksman, "Experimental Allergic Encephalomelitis and the 'auto-allergic' Diseases," I. Arch. Allerg. appl. Immunol., 14 (suppl.) 1, 1959; and I. R. Mackay and F. M. Burnet, "Auto-Immune Diseases, Pathogenesis, Chemistry and Therapy," Charles C. Thomas, Springfield, 1963.)

The surprising efficacy of the compounds of Formula I above in the treatment of EAE has indicated that they are active, non-toxic, immunosuppressive agents. In the practicing of the method of the invention, the compounds of Formula I may be administered alone or in combination with pharmaceutically acceptable carriers, the proportion of which is determined by the solubility and chemical nature of the compound selected, the chosen route of administration, and standard pharmaceutical practice. For example, they may be administered orally in the form of tablets or capsules, which may contain conventional excipients, or in the form of solutions; or they may be injected parenterally, that is intramuscularly, intravenously or subcutaneously. For parenteral administration, they may be used in the form of sterile solutions containing other solutes, for example, enough saline or glucose to make the solutions isotonic.

The dosage of the present therapeutic agents will vary with the form of administration and the particular compound chosen. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 20 to 200 milligrams per kilogram (mg./kg.) of body weight per day, although as aforementioned, variations will occur. In general, larger animals require smaller doses on an mg./kg. basis than do smaller animals.

The following examples are illustrative of the preparation of the compounds useful in the method of invention and of the exercising of the latter, but are not to be considered necessarily limitative thereof:

EXAMPLE I

The periodate oxidation product of adenosine in the amount of 5.31 grams (g.) equivalent to 20 millimoles (mmoles), is wet with 60 milliliters (ml.) of ethanol, dissolved in 200 ml. of water and admixed with 2.74 g. (20 mmoles) of isonicotinic acid hydrazide. After two to three hours the clear solution begins to deposit fine needle-like crystals, and the mixture is shaken to form a solid crystalline mass. The crystals are filtered off, washed with cold water, ethanol, and ether, and dried in vacuo over silica gel to give 6.66 g. of N-[2-(6-amino-9H - purin - 9 - yl)-3,5-dihydroxy-6-(hydroxymethyl) morpholino]isonicotinamide trihydrate (73 percent of theoretical yield).

The above product precipitates from the reaction mixture in analytically pure form, but, if desired, it can be recrystallized from hot water at a concentration of 1.25 g. per 300 ml. It is slightly soluble in water (0.2 percent by weight) and soluble in 0.1 normal (N) hydrochloric acid, 0.1 N sodium hydroxide (solutions turn yellow shortly), pyridine, acetic acid, dimethylacetamide, dimethylsulfoxide, and insoluble in the common organic solvents. It decomposes when heated in vacuo at 56° C. and gives no definite melting point when heated in a capillary tube.

Based on the formula $C_{16}H_{18}N_8O_5 \cdot 3H_2O$, it was calculated that the elemental analysis would be C, 42.10; H, 5.30; N, 24.53; $H_2O$, 11.85. The product was analyzed and the elemental analysis was found to be C, 42.11; H, 5.46; N, 24.31. The amount of water of hydration was found to be $H_2O$, 12.2—by the Abderhalden method and 12.6 by the Karl Fischer method. The result may be expressed:

*Analysis.*—Calc'd. for $C_{16}H_{18}N_8O_5 \cdot 3H_2O$ (percent): C, 42.10; H, 5.30; N, 24.53; $H_2O$, 11.85. Found (percent): C, 42.11; H, 5.46; N, 24.31; $H_2O$, 12.2—Abderhalden, 12.6—Karl Fischer.

For the product the wave length of maximum absorption in infrared illumination was found to be at 6.05 microns ($\mu$) using a potassium bromide cell. The result may be expressed:

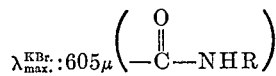

The wavelength of maximum absorption in ultra-violet illumination is 259 millimicrons (m$\mu$) in a 0.1 N hydrochloric acid solvent, and the extinction coefficient is 20,500. The result may be expressed:

$$\lambda_{max.}^{0.1NHCl}:259 \text{ m}\mu(\epsilon=20,500).$$

EXAMPLE II

Following the procedure of the previous example, the periodate oxidation product of cytidine is treated with 2-methylisonicotinic acid hydrazide to afford N-[2-(4-amino-1, 2-dihydro-2-oxo-1-pyrimidinyl) - 3,5 - dihydroxy-6-(hydroxymethyl)morpholino] - 2 - methylisonicotinamide dihydrate.

*Analysis.*—Calc'd for $C_{16}H_{20}N_6O_6 \cdot 2H_2O$ (percent): C, 44.8; H, 5.6; N, 19.6; $H_2O$, 8.4. Found (percent): C, 45.5; N, 5.8; N, 19.4; $H_2O$, 7.5—Abderhalden.

EXAMPLE III

According to the method of the previous examples, N-[2-(4-amino - 1,2 - dihydro-2-oxo-1-pyrimidinyl)-3,5-dihydroxy - 6 - (hydroxymethyl)morpholino]isonicotinamide is prepared by reacting the periodate oxidation product of cytidine with isonicotinic acid hydrazide (yield 72 percent).

*Analysis.*—Calc'd for $C_{15}H_{18}N_6O \cdot 2\frac{1}{2} H_2O$ (percent): C, 42.58; H, 5.47; $H_2O$, 10.65. Found (percent): C, 42.89; H, 5.48; $H_2O$, 10.34—Abderhalden.

EXAMPLE IV

To prepare N-[3,5-dihydroxy - 6 - hydroxymethyo-2-(1,2,3,4-tetrahydro - 2,4 - dioxo-1-pyrimidinyl)-morpholino]-2 - methylisonicotinamide dihydrate, the periodate oxidation product of uridine is reacted with 2-methylisonicotinic acid hydrazide according to Example I.

*Analysis.*—Calc'd for $C_{16}H_{19}N_5O_7 \cdot 2H_2O$ (percent): C, 44.74; H, 5.40; $H_2O$, 8.38. Found (percent): C, 44.76; H, 5.31; $H_2O$, 8.50—Abderhalden; 9.36—Karl Fischer.

EXAMPLE V

The use of the compounds in the blocking of an auto-immune process

Experimental allergic encephalomyelitis (EAE) in rats is characterized by clinical symptoms which occur 11 to 15 days after inoculation of the animal with an encephalitogenic emulsion consisting of isologods spinal cord emulsified in complete Freund's adjuvant. The symptoms initially consist of ataxia or paresis followed by flaccid paralysis of the hindquarters, urinary incontinence, fecal impaction and weight loss. These clinical symptoms are accompanied by hematologic changes consisting of increased polymorphonuclear cells and decreased lymphocyates, the thymus and spleen are significantly reduced in weight and the adrenals are increased in weight. Table I below shows the protective effect of the test compound, N-[2-(6-amino-9H-purin-9-yl)-3,5-dihydroxy - 6 - (hydroxymethyl)morpholino]isonicotinamide, against EAE compared with other drugs of known effectiveness. Twelve animals were used in the control group and in each of the drug-treated groups. The drugs were administered either orally or subcutaneously as shown. The dose is stated in milligrams per kilogram (mg./kg.) of the body weight of the host. The dose response for the test compound is shown.

TABLE I

| Drug | Dose, mg./kg. | Frequency | Total No. doses | Percent paralysis |
|---|---|---|---|---|
| Control | | | | 90-100 |
| Cortisone | 8.5 subcutaneously | Daily | 13 | 0 |
| 6-mercaptopurine | 60 oral | Alternate days | 6 | 0 |
| Methotrexate | 0.25 oral | do | 6 | 0 |
| Cytoxan | 10 oral | do | 6 | 0 |
| Imuran | 100 oral | do | 6 | 0 |
| Thioguanine | 5 oral | do | 6 | 0 |
| Test compound | 10 oral | do | 6 | 100 |
| Do | 100 oral | do | 6 | 42 |
| Do | 150 oral | do | 6 | 0 |
| Do | 200 oral | do | 6 | 0 |

The results in Table I above indicate that the test compound is active against EAE.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A compound selected from the group consisting of those having the formula

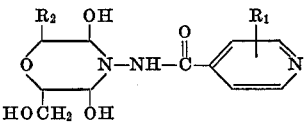

wherein $R_1$ is selected from the group consisting of hydrogen and methyl and $R_2$ is selected from the group consisting of

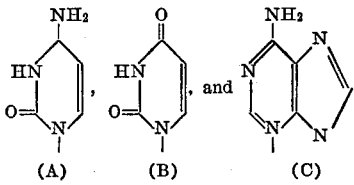

2. A compound as described in claim 1 which is: N-[2-(6-amino-9H-purin-9-yl)-3,5-dihydroxy-6 - (hydroxymethyl)morpholino]isonicotinamide.

3. A compound as described in claim 1 which is: N-[2-(4-amino-1,2-dihydro-2-oxo - 1 - pyrimidinyl) - 3,5 - dihydroxy - 6 - (hydroxymethyl)morpholino]-2-methylisonicotinamide.

4. A compound as described in claim 1 which is: N-[2-(4-amino-1,2-dihydro-2-oxo - 1 - pyrimidinyl) - 3,5 - dihydroxy-6-(hydroxymethyl)morpholino]isonicotinamide.

5. A compound as described in claim 1 which is: N-[3,5 - dihydroxy - 6 - (hydroxymethyl)-2-(1,2,3,4-tetrahydro-2,4-dioxo-1-pyrimidinyl)morpholino]-2 - methylisonicotinamide.

6. A process for preparing a compound selected from the group consisting of those having the formula:

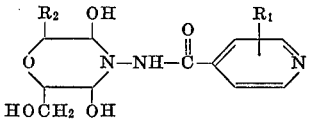

wherein $R_1$ is selected from the group consisting of hydrogen and methyl and $R_2$ is selected from the group consisting of

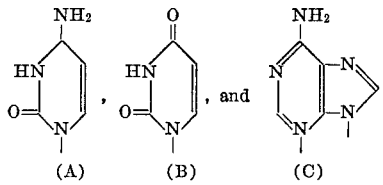

which comprises reacting the product of periodate oxidation of a compound selected from the group consisting of 6 - amino-9-β-D-ribofuranosyl-9H-purine, 4-amino-1-β-D-ribofuranosyl-2(1H)-pyrimidinone, and 1-β-D - ribofuranosyl-2,4-pyrimidinediol, with an isonicotinic acid hydrazide having the formula:

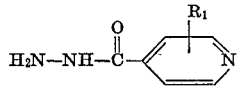

wherein $R_1$ is defined as above.

References Cited

UNITED STATES PATENTS 3,164,590   1/1965   Lovell _____ 260—247.2

ANNE MARIE T. TIGHE, Primary Examiner

U.S. Cl. X.R.

260—252, 260, 256.4; 424—248